UNITED STATES PATENT OFFICE.

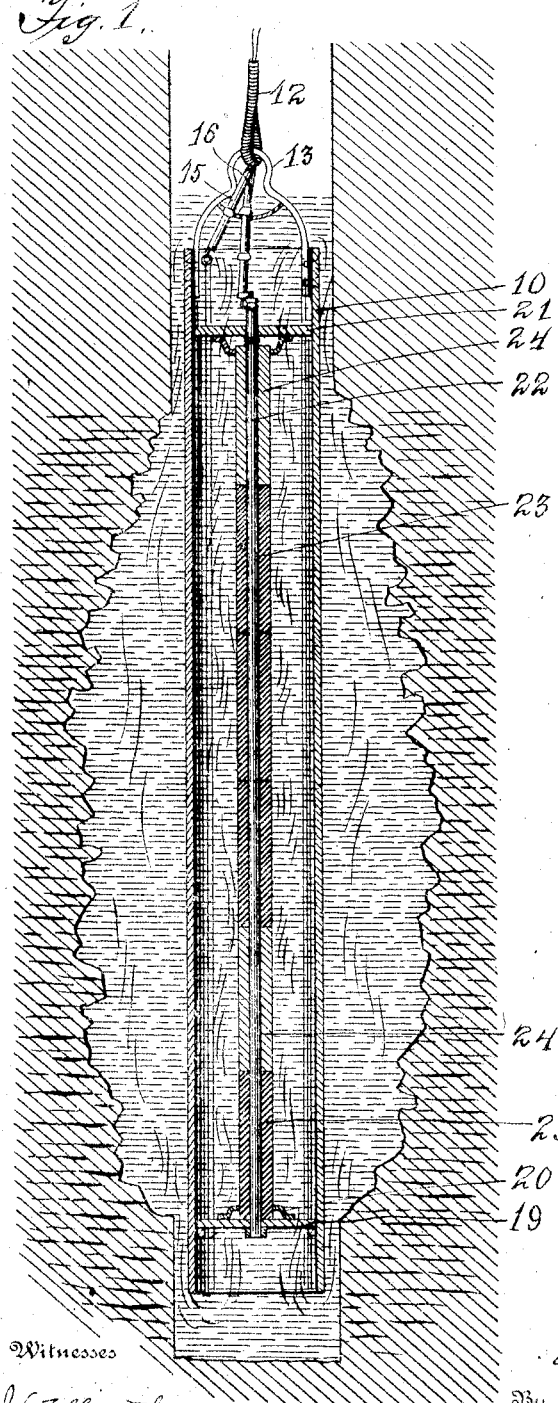
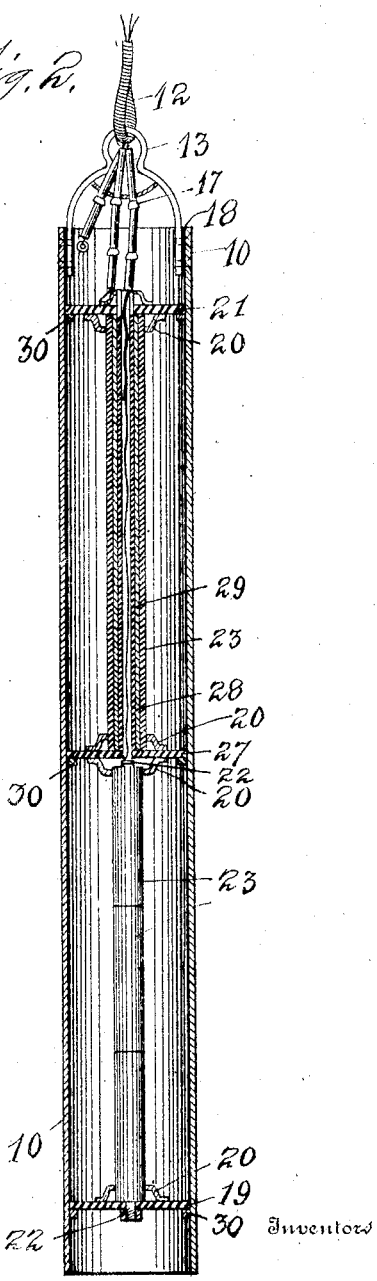

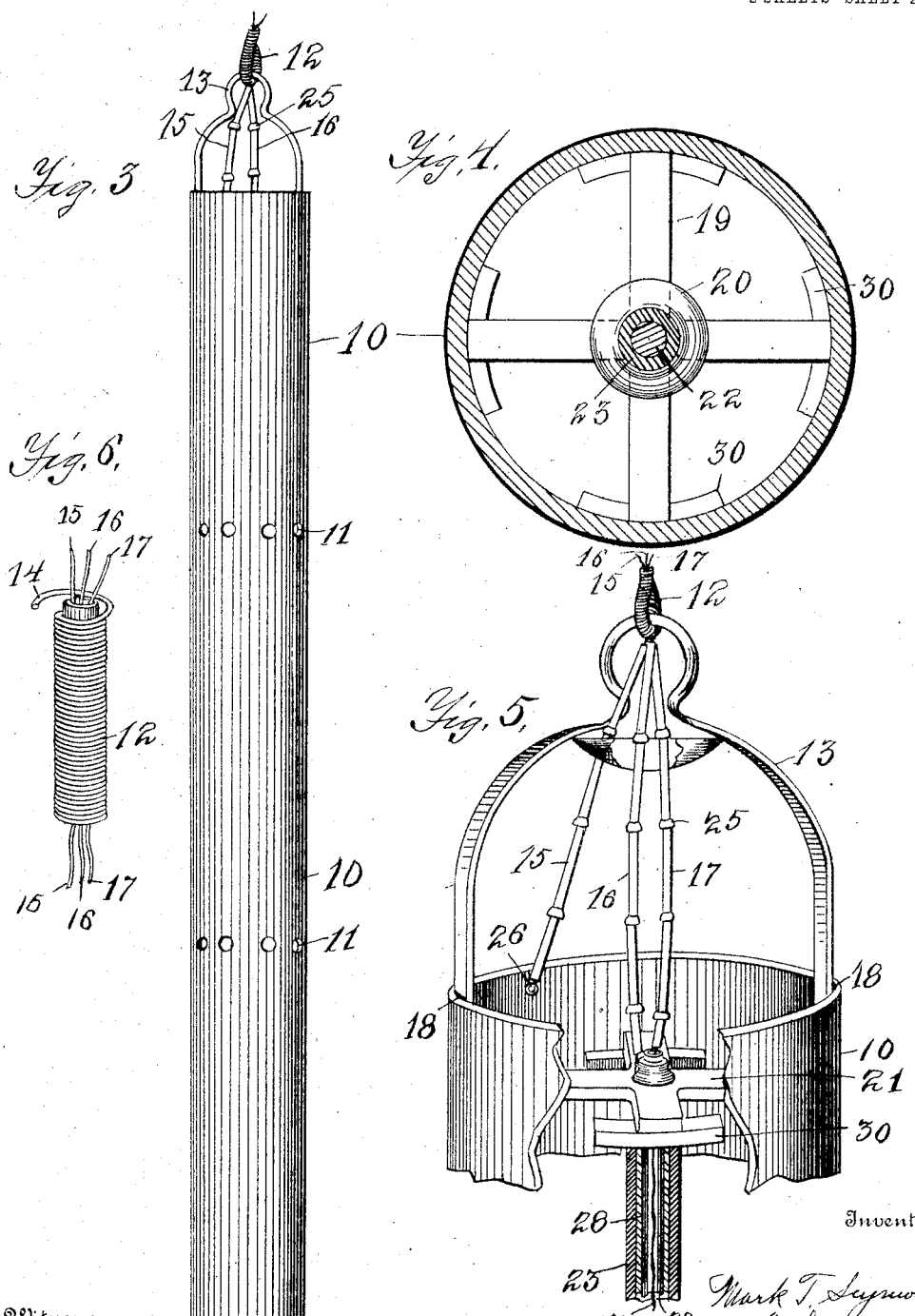

MARK T. SEYMOUR, OF BEMUS POINT, AND ALTON W. BALL, OF STOWE, NEW YORK.

ELECTRICAL FLUID-HEATER.

No. 884,424.

Specification of Letters Patent.

Patented April 14, 1908.

Application filed December 2, 1907. Serial No. 404,738.

*To all whom it may concern:*

Be it known that we, MARK T. SEYMOUR and ALTON W. BALL, citizens of the United States, and residents, respectively, of the towns of Bemus Point and Stowe, in the county of Chautauqua and State of New York, have invented new and useful Improvements in Electrical Fluid-Heaters, of which the following, taken in connection with the accompanying drawings, is a full, clear, and exact description.

The invention relates to devices for heating fluids by means of electricity and the object of our improvement is to provide a simple and convenient tubular electric heater which produces as much of ebullition of the fluid when placed therein, as possible, and toward this end the heater is left open at each end so that the fluid passes through the heater, as it is heated and rises, and the cold fluid sinks to the bottom, thereby producing a movement of the fluid which increases in proportion to the degree of heat until the boiling point is reached, at which point it will be recognized that there will be strong ebullition of the fluid as in boiling of fluids.

Our electrical heater is primarily devised for use in cleaning oil wells, as shown in the drawings, but it may be used for heating fluids in all manner of receptacles or for different purposes and not depart from our invention. In cleaning oil wells, as is well known, the paraffins and other ingredients of the oil clog the crevices of the oil bearing portion of the rock and thereby stop the flow of the well. The purpose of heating the fluid is to melt the paraffin and other gummy substances such as gypsum from the walls of the well and in order to dislodge the same a strong ebullition of fluid therein is produced, as above described and as shown in Fig. 1 of the drawings.

Our device may be used to heat the oil in the well, but preferably the oil or other fluids are bailed from the well until it is clean and a sufficient amount of salt water is poured into the well to cover above the oil producing portion of the rock. The salt water heats easily and provides a fluid instrument which is not a solvent, when heated quickly melts the paraffin, gypsum and other deposits of the oil. The melted paraffin rises to the top of the salt water and then may be easily bailed from the well. The salt water is then entirely removed and the crevices of the rock having been thus thoroughly cleansed, the flow of the well is restored.

In the drawings, Figure 1 is a lengthwise sectional view of the oil bearing portion or shot cavity of an oil well with a sectional view of a single form of heater therein, the ebullition of the fluid in the well being indicated. Fig. 2 is a lengthwise sectional view of a double form of heater so arranged that the current can be turned on to one-half or the whole of the heater according to the amount of heat desired, or, when used in an oil well so that the entire amount of heat can be turned on to raise the fluid to the desired degree of heat, and then it can be held at that point for any desired length of time by reducing current one-half. Fig. 3 is an elevation of the heater case. Fig. 4 is a sectional view at line X X in Fig. 2 showing the spider with the cup thereon for the rod and carbons. Fig. 5 is an enlarged perspective view of the upper portion of the heater, the lower portion being broken away, showing the electrical connection to the different parts from the cable. Fig. 6 is a detail of a short section of the armored cable for sustaining the heater in the oil well.

Similar numerals refer to corresponding parts in the several views.

The numeral 10 indicates the tubular casing which is preferably made of galvanized sheet metal, though it may be made of any form of sheet metal provided a zinc lining be placed on the inner side, since the tubular casing 10 forms one of the poles in the heater.

The casing 10 is formed with open ends so that the fluid may pass through the same from end to end. It should be about four inches and a half in diameter for use in the ordinary oil well, which varies in diameter but is usually about five or six inches. In some cases the casing 10 may not be entirely submerged in the fluid, accordingly it is preferred to have openings 11 therein so that the fluid can pass out through the same under the strong ebullition of the fluid then raised to the boiling point.

The casing 10 is suspended in the oil well by means of a cable 12 and bail 13. The cable 12 is a so called "armored" cable by means of the wire 14 wound around the cable, which arrangement leaves it flexible yet protects it from chafing and uncovering the electrical wires 15 and 16 within the cable. It also adds great strength to the cable. It will be appreciated that a thousand or fifteen hundred feet of cable has great weight and there is added to this the weight of the heater.

For the simple form of single heater, shown in Fig. 1, two strands of wire 15 and 16 are sufficient. For the more complex form of double heater, shown in Fig. 2, a third wire 17 is provided and used in a manner hereinafter set forth. The bail 13 is insulated at 18 from the case 10 so that there can be no leakage of electricity from the bail to the casing.

The other pole of the heater is formed in the following manner: A spider or rack 19 is provided near the lower end within the heater having suitable support 30 on the inner side of the casing 10. The spider 19 is made of porcelain or other suitable insulating material and has near its center on the upper side the cup 20. A similar spider 21 is provided with supports 30 near the upper end of the casing, having a cup 20 on its under side. In the simple form of single heater, shown in Fig. 1, a rod 22 connects the two spiders, the rod having suitable nut at the upper end to hold the same. Rod 22 is incased in a tubular carbon by slipping over the same carbon tubular sections 23. It is preferred that the carbon tubing be made in sections to give ease in handling the same and also so that porcelain sections 24 may be inserted in place of the carbon sections when it is desired to reduce the amount of heat. Thus in Fig. 1 the top section and the fifth therefrom is a porcelain section and the remaining sections are of carbon and the surface of transmission is reduced one third. The cups 20 are sufficiently large to hold the ends of the carbons firmly in place both at the top and bottom.

The wires 15, 16 and 17 are preferably incased in porcelain tubes 25 in connecting the cable 12 with the different parts of the heater. The wire 15 from the cable connects with the casing 10 at 26 and the wire 16 connects with the upper end of the rod 22. It is now apparent that when the space within the tubular casing 10 is filled with fluid, as shown in Fig. 1, and the electrical current is turned on to the heater, the resistance of the fluid as the electricity passes from the positive carbon pole to the negative pole or casing, will quickly heat the fluid, raising it to the boiling point and causing its ebullition as above described.

It is ofttimes preferable as above described to control the amount of heat within the well. In order to give a larger control, the double heater shown in Fig. 2 is preferred. This form of heater is made the same as that shown in Fig. 1 hereinbefore described, with the exception of a middle spider 27 which is made the same as spiders 19 and 21 except that cups 20 are placed on the upper and under sides of the spider.

The heater is made in two sections. The lower section of the heater is made with rod 22 and carbons 23 the same as the single heater. In the upper section, however, a connecting tube 28 takes the place of the connecting rod 22, over which the sections of carbon 23 or porcelain 24 are placed. Within the tube 28 tubular insulation 29 is provided and the third wire 17 extends down through the tubular insulation 29 to the lower section connecting with its rod 22 and supplying it with electricity. The wire 16 is connected to the upper end of tube 28 and supplies the upper section with its current of electricity, the wire 15 connecting with the casing as in the single heater.

It is now apparent that the electrical current may be turned on one or both sections of the heater as desired and that by the cutting off of one of the electrical currents from either the wire 16 or 17, the amount of heat produced will be exactly one-half that of the full current upon the heater. This form of control for the electrical current in the heater is preferred for oil wells over the use of the porcelain 24 since the full amount of heat can be utilized in quickly raising the cold fluid within the well to the desired boiling point and then the heat can be reduced by cutting off the current from one-half of the heater.

Where the exact amount of heat needed within the well is known and no change is desired after once placing the heater in the well, the use of the porcelains 24 for reducing the amount of heat may be utilized.

The spiders 19, 21, and 27 are preferably made removable so that they may be packed for shipping, and also for the easy assembling of this portion of the heater. Accordingly the supports 30 for the carbons do not extend clear around the interior circumference of the casing 10, but only a portion of the distance, as shown in Fig. 4, so that the lower spiders may be inserted in the spaces between the supports 30 and then by turning them slightly they are caused to rest upon said supports 30.

We claim as new:

1. An electrical heater for fluids consisting of an open-ended metal tube, spiders or racks carried by said tube within the same, said spiders insulated from said tube, a connecting rod for said spiders, tubular carbon over said metal connecting rod, separate electrical connection for said metal tube and for said connecting rod, said metal tube being sufficiently large to allow free flow of the fluid between said tube and said carbon and rod.

2. An electrical heater for fluids consisting of an open-ended metal tube of equal diameter throughout, spiders or racks of insulating material supported within said tube, a metal rod connecting said spiders, tubular carbon sections around said connecting rod, and separate wires connected to said metal tube and said connecting rod, substantially as and for the purpose specified.

3. An electrical heater for fluids consisting of an open-ended metal tube, spiders or racks of insulating material within said tube, said spiders having supports within said tube, a metal rod connecting said spiders, a tubular covering for said connecting rod consisting in part of electrical conducting material and in part of non-electrical conducting material, separate electrical wires connected to said metal tube and said connecting rod, said heater having space for the free flow of the fluid through said metal tube.

4. An electrical heater for fluids consisting of an open-ended metal tube, three spiders of insulating material having suitable supports at spaced distances within said metal tube, a metal rod connecting the central spider and a spider at or near one end of said tube, tubular carbon sections around said rod, a metal tube connecting said central spider and the spider at or near the other end of said metal tube, tubular carbon sections slipped on to said metal connecting tube, tubular insulation within said metal connecting tube, an electric wire extending down through said tubular insulation to said connecting rod, a second wire connected to said connecting tube, and a third wire connecting said open-ended metal tube, said open-ended metal tube having free space for the flow of the fluid between said carbon and said open-ended metal tube.

In testimony whereof we have signed our names to this specification in the presence of two subscribing witnesses.

MARK T. SEYMOUR.
ALTON W. BALL.

Witnesses:
I. A. ELLSWORTH,
A. W. KETTLE.